United States Patent
Kim et al.

(10) Patent No.: US 9,655,043 B2
(45) Date of Patent: May 16, 2017

(54) METHOD AND APPARATUS FOR REDUCING POWER CONSUMPTION BY EARLY DECODING

(71) Applicant: Samsung Electronics Co., Ltd., Gyeonggi-do (KR)

(72) Inventors: Ho-Il Kim, Gyeonggi-do (KR); Shin-Woo Kang, Seoul (KR); Soo-Bok Yeo, Gyeonggi-do (KR); Min-Goo Kim, Gyeonggi-do (KR); Chae-Hag Yi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 233 days.

(21) Appl. No.: 14/667,075

(22) Filed: Mar. 24, 2015

(65) Prior Publication Data

US 2015/0289205 A1 Oct. 8, 2015

Related U.S. Application Data

(60) Provisional application No. 61/976,796, filed on Apr. 8, 2014.

(30) Foreign Application Priority Data

Sep. 11, 2014 (KR) ........................ 10-2014-0120112

(51) Int. Cl.
*H04W 52/02* (2009.01)
*H04L 1/18* (2006.01)
*H04L 1/00* (2006.01)

(52) U.S. Cl.
CPC ..... *H04W 52/0216* (2013.01); *H04W 52/028* (2013.01); *H04W 52/0229* (2013.01); *H04L 1/0053* (2013.01); *H04L 1/1854* (2013.01); *Y02B 60/50* (2013.01)

(58) Field of Classification Search
None
See application file for complete search history.

(56) References Cited

U.S. PATENT DOCUMENTS 7,957,758 B2 * 6/2011 Soerensen ............. H04L 1/0053
370/311
2012/0281675 A1 * 11/2012 Liang .................... H04L 1/1854
370/331

* cited by examiner

*Primary Examiner* — Vinncelas Louis
(74) *Attorney, Agent, or Firm* — The Farrell Law Firm, P.C.

(57) ABSTRACT

Methods and apparatuses are provided for reducing power consumption by early decoding. It is determined whether a predetermined decoding condition is satisfied upon expiration of a time unit in a transmission time interval. Decoding is performed on a signal that has been received through the time unit in the transmission time interval, when the predetermined decoding condition is satisfied. A controller outputs an instruction signal to a RF processor to set to a low-power mode during a remaining time period of the transmission time interval after the time unit in the transmission time interval, when the decoding is successful. Decoding is performed on the signal that has been received through the RF processor upon expiration of a last time unit of the transmission time interval regardless of the predetermined decoding condition, when the time unit is the last time unit in the transmission time interval.

19 Claims, 12 Drawing Sheets

METHOD AND APPARATUS FOR REDUCING POWER CONSUMPTION BY EARLY DECODING

PRIORITY

This application claims priority under 35 U.S.C. §119(a) to a Korean patent application filed in the Korean Intellectual Property Office on Sep. 11, 2014 and assigned Ser. No. 10-2014-0120112,1 and under 35 U.S.C. §119(e) to a U.S. Provisional Patent Application filed in the U.S. Pat. and Trademark Office on Apr. 8, 2014 and assigned Ser. No. 61/976,796,1 the contents of which are incorporated herein by reference.

BACKGROUND

1. Field

The present disclosure relates to a method and an apparatus for reducing power consumption in a receiver supporting early decoding

2. Description of the Related Art

A wireless communication system may be implemented based on various technologies for high-speed packet data communication. One of the various technologies may include error correction decoding.

In the wireless communication system, a transmitter may encode and transmit information bits of the data to be transmitted, in units of packets, by means of an encoder, and a receiver may receive the encoded packets over a wireless channel and decode the received packets by means of a decoder, thereby recovering the information bits.

The decoder may attempt to decode some signals in one transmission time interval (TTI), before receiving all of the signals corresponding to one TTI for encoding. If the channel condition is good, the receiver is more likely to succeed in decoding before receiving all of the signals of one TTI. In this case, the receiver may unnecessarily receive signals for the remaining period in which the receiver has not yet received signals.

SUMMARY

The present disclosure has been made to address at least the above problems and/or disadvantages and to provide at least the advantages described below. Accordingly, an aspect of the present disclosure provides a method and an apparatus for supporting early decoding in a wireless communication system.

Another aspect of the present disclosure provides a method and an apparatus for reducing power consumption in a receiver supporting early decoding.

Another aspect of the present disclosure provides a method and an apparatus for controlling a receiver circuit depending on an operation of a digital error correction decoder.

Another aspect of the present disclosure provides a method and an apparatus for reducing power consumption of a wireless terminal by controlling a receiver circuit depending on the decoding success.

Another aspect of the present disclosure provides a method and an apparatus for determining an early decoding time for a digital error correction decoder.

Another aspect of the present disclosure provides a method and an apparatus for controlling an early decoding operation of a digital error correction decoder.

BRIEF DESCRIPTION OF THE DRAWINGS

The above and other aspects, features, and advantages of embodiments of the present disclosure will be more apparent from the following detailed description when taken in conjunction with the accompanying drawings, in which.

DETAILED DESCRIPTION

Figure 1:
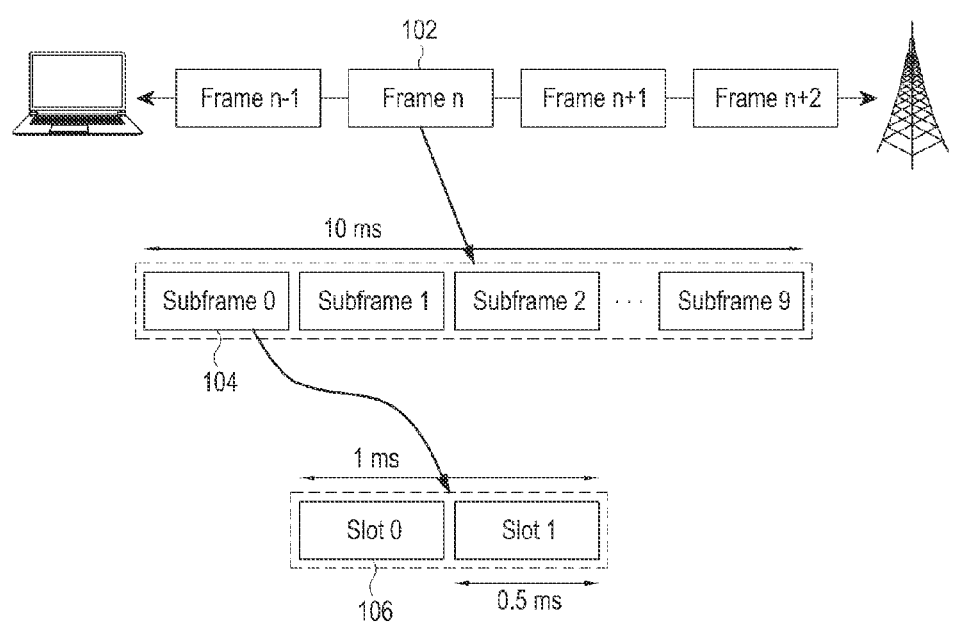
FIG. 1 is a diagram illustrating a frame structure for a wireless communication system, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms and words used in the following description and claims are not limited to their dictionary meanings, but, are merely used to enable a clear and consistent understanding of the disclosure. Accordingly, it should be apparent to those skilled in the art that the following description of embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It will be appreciated that blocks in flow diagrams, and combinations of the flow diagrams can be performed by computer program instructions. Since the computer program instructions can be equipped in a processor of the general-purpose computer, the special-purpose computer or other programmable data processing equipments, the instructions performed by the processor of the computer or other programmable data processing equipments may generate a means for performing the functions described in the flow diagram block(s). To implement the functions in a particular way, these computer program instructions may be stored in a computer-available or computer-readable memory capable of directing the computer or other programmable data processing equipments, so the instructions stored in the computer-available or computer-readable memory may produce the manufactured items including the instruction means for performing the functions described in the flow diagram block(s). Since the computer program instructions can be equipped in the computer or other programmable data processing equipments, the instructions to perform the computer or other programmable data processing equipments by generating a process in which a series of operating steps are performed in the computer or other programmable data processing equipments and executed by the computer, may provide the steps for executing the functions described in the flow diagram block(s).

Each block may represent a part of the module, segment or code including one or more executable instructions for executing the specified logical function(s). In some alternative examples, it should be noted that the features mentioned in the blocks may be generated without the order. For example, two blocks shown in succession may be performed substantially simultaneously, or the blocks may sometimes be performed in the reverse order depending on their functions.

The term '~ unit', as used herein, means a software component, or a hardware component such as field-programmable gate array (FPGA) or application specific integrated circuit (ASIC), and the '~ unit' may perform certain tasks. However, the '~ unit' will not be limited to the software or the hardware. The '~ unit' may be configured to exist in an addressable storage medium, or may be configured to run one or more processors. Therefore, as an example, the '~ unit' may include components such as, for example, software components, object-oriented software components, class components and task components, processes, functions, attributes, procedures, subroutines, segments of program code, drivers, firmware, microcode, circuits, data, databases, data structures, tables, arrays, and variables. The functions provided in the components and the '~ units' may be combined in fewer components and '~ units', or may be subdivided in additional components and '~ units'. The components and the '~ units' may be implemented to run one or more central processing units (CPUs) in a device or a secure multimedia card.

Although embodiments of the present disclosure are described in detail with reference to an orthogonal frequency division multiplexing (OFDM)-based wireless communication system, it will be apparent to those of ordinary skill in the art that the subject matter of the present disclosure may be applied to other communication systems and services having a similar technical background and channel format without departing from the spirit and scope of the present disclosure.

In accordance with another aspect of the present disclosure, an apparatus is provided for reducing power consumption by early decoding. The apparatus includes a baseband processor configured to process a received signal from a RF processor, a decoder configured to decode an output signal of the baseband processor, and a controller. The controller is configured to: determine whether a predetermined decoding condition is satisfied upon expiration of a time unit in a transmission time interval; control the decoder to perform decoding on a signal that has been received through the unit time in the transmission time interval, when the predetermined decoding condition is satisfied; transmit an instruction signal to the RF processor to set a low-power mode during a remaining time period of the transmission time interval after the time unit in the transmission time interval, when the decoding is successful; and control the decoder to perform decoding on the radio signal upon expiration of a last time unit of the transmission time interval regardless of the predetermined decoding condition, when the time unit is the last time unit in the transmission time interval.

In accordance with another aspect of the present disclosure, an apparatus is provided for reducing power consumption by early decoding. The apparatus includes a baseband processor configured to process a received signal from a RF processor, a decoder configured to decode an output signal of the baseband processor, and a controller. The controller is configured to perform decoding on a signal that has been received through a predetermined early decoding time in a transmission time interval; control the decoder to perform decoding on the radio signal that has been received at a next time unit in the transmission time interval, when the decoding fails; determine whether a consecutive decoding success count including a decoding success over the transmission time interval exceeds a predetermined threshold, when the decoding succeeds; and reduce the predetermined early decoding time by the single time unit, if the consecutive decoding success count exceeds the predetermined threshold.

In accordance with another aspect of the present disclosure, an apparatus is provided for reducing power consumption by early decoding. The apparatus includes an RF processor configured to receive a radio signal, a baseband processor configured to process an output signal of the RF processor, a decoder configured to decode an output signal of the baseband processor, and a controller. The controller is configured to: determine whether to perform early decoding in a transmission time interval, depending on at least one of a power consumption gain that can be obtained through early decoding, and a reception quality during a predetermined time period preceding the transmission time interval, at a start time of the transmission time interval; control the decoder to perform decoding on the radio signal through a predetermined early decoding time in the transmission time interval, when it is determined to perform the early decoding; and set the RF processor to a low-power mode during a remaining time period of the transmission time interval, when the decoding succeeds.

In the embodiments of the present disclosure described below, a digital error correction decoder (hereinafter referred to as a 'decoder') of a wireless terminal may attempt decoding at every predetermined unit time before receiving all of the signals corresponding to one TTI, and may reduce power consumption of the wireless terminal by controlling a receiver circuit depending on the decoding success at every decoding.

FIG. 1 is a diagram illustrating a frame structure for a wireless communication system, according to an embodiment of the present disclosure.

Referring to FIG. 1, wireless communication between a transmitter and a receiver may be made over a transport channel. In a downlink, the transmitter may be a base station and the receiver may be a wireless terminal. In an uplink, the transmitter may be a wireless terminal and the receiver may be a base station. A TTI of the transport channel may have (or consist of) one or multiple frames 102. One frame 102 may have multiple subframes 104, and each subframe 104 may include multiple slots 106.

In 3rd generation partnership project (3GPP) long-term evolution (LTE), which is one of the standards for wireless communication, one frame having a length of 10 ms may be divided into 10 subframes each having a length of 1 ms, and each subframe may be divided into 2 slots each having a length of 0.5 ms. One subframe may be the minimum unit of a TTI, and in the TTI, a minimum of 1 ms to a maximum of 40 ms may be allocated for each transport channel (TrCH).

Bits that are output after undergoing encoding may be evenly spread to multiple frames corresponding to one TTI by a channel interleaver. A decoder may receive signals of one TTI through a baseband (BB) processor (including, for example, a demodulator), and then decode the received signal at every predetermined time unit. The time unit may be, for example, a half slot, one slot, or multiple slots.

Figure 2:
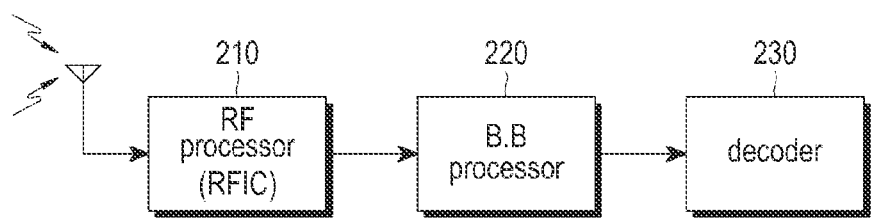
FIG. 2 is a block diagram illustrating a structure of a receiver including a decoder in a wireless communication system, according to an embodiment of the present disclosure.

FIG. 2 is a block diagram illustrating a structure of a receiver including a decoder in a wireless communication system, according to an embodiment of the present disclosure.

Referring to FIG. 2, an RF processor 210 may receive a radio signal via a receive antenna, convert the received radio signal into a baseband signal, and provide the baseband signal to a BB processor 220. The BB processor 220 may process the baseband signal in accordance with a signal processing algorithm. A decoder 230 may perform channel decoding on the signal output from the BB processor 220 to correct an error, and then recover the information bits transmitted by a transmitter.

The decoder 230 may generally perform decoding after receiving all of the multiple frames corresponding to one TTI through the BB processor 220 (including, for example, a demodulator). Herein, this will be referred to as a normal decoding mode.

Figure 3:
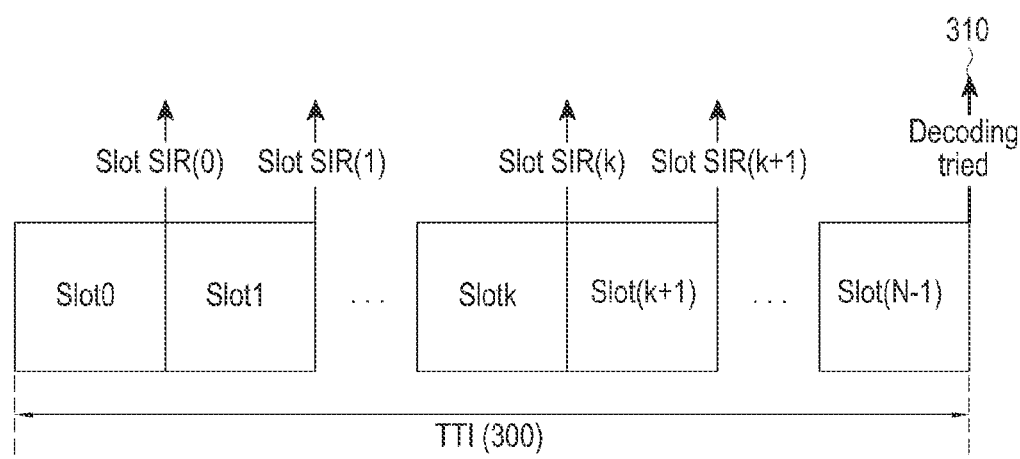
FIG. 3 is a timing diagram illustrating a decoding operation of a normal decoding mode.

FIG. 3 is a timing diagram illustrating a decoding operation of a normal decoding mode.

Referring to FIG. 3, one TTI 330 includes N slots, and the BB processor 220 (or an undepicted channel estimator) may measure the channel quality (e.g., link quality or signal quality), for example, a signal to interference ratio (SIR), for a signal of a slot at every slot. The decoder 230, in the normal decoding mode, may attempt to decode all of the received signals of the TTI at a time 310 (e.g., the boundary of the TTI) where the signal of the last slot is completely received, so the decoding time may be independent of the channel quality of each slot.

When the decoder 230 operates in the normal decoding mode, the RF processor 210 may operate in a high or normal-signal quality mode (hereafter referred to as a normal-signal quality mode) to secure the good signal quality (e.g., a low block error rate (BLER). The normal-signal quality mode may operate to generate a signal having, for example, an error vector magnitude (EVM) that is higher than a predetermined threshold.

Figure 4:
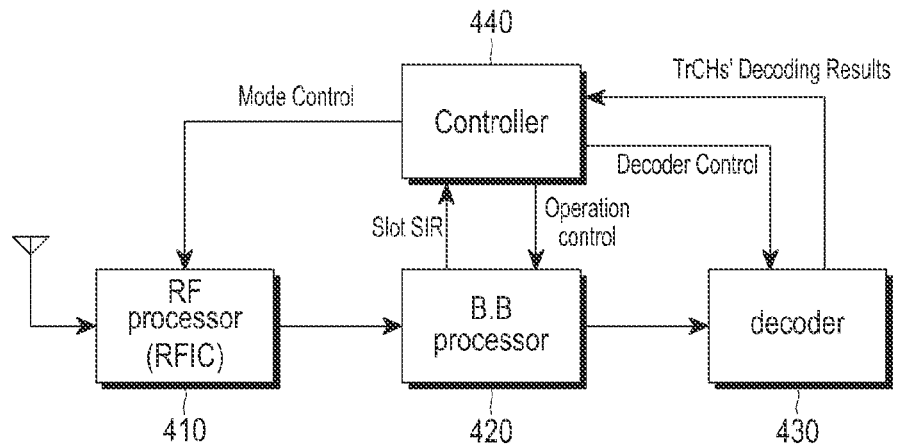
FIG. 4 is a block diagram illustrating a structure of a receiver supporting early decoding, according to an embodiment of the present invention.

FIG. 4 is a block diagram illustrating a structure of a receiver supporting early decoding, according to an embodiment of the present disclosure.

Referring to FIG. 4, an RF processor 410 may receive a radio signal via a receive antenna, convert the received signal into a baseband signal, and provide the baseband signal to a BB processor 420. The BB processor 420 may process the baseband signal in accordance with a signal processing algorithm. A decoder 430 may perform channel decoding on the signal output from the BB processor 420 to correct an error, and then recover the information bits transmitted by a transmitter.

The decoder 430 supporting early decoding may attempt decoding in units of slots before receiving all of the signals of one TTI. Herein, this will be referred to as an early decoding mode.

The decoder 430 may attempt to decode the signals that have been received until an early decoding time in the TTI, at the early decoding time before the expiry of one TTI. During decoding, signals of slots that have not yet been received, among the slots constituting one TTI, may be filled with 'erasure(=0)', and signals of the slots that have already been received, and the signals filled with the 'erasure' may be the target of decoding. If the effective coding rate is low and the channel condition is good, it is more likely to succeed in decoding even with signals of some period constituting one TTI and signals of the remaining period, which are filled with the 'ensure', since the signal quality of each unit period constituting one TTI is relatively high. If decoding is successful, the RF processor 410 may stop the unnecessary reception operation during the period corresponding to the slots that have not yet been received, in the TTI, thereby reducing the power consumption.

For example, adaptive multi-rate (AMR) 12.2 kbps, which is one of the 3GPP transmission modes, uses a relatively low channel coding rate during a TTI, and in a good-channel condition environment, a voice transport channel is highly likely to be successfully received even though only some slots in the TTI are used. Since the normal decoding mode attempts decoding after receiving all signals of one TTI even in the good channel condition, the RF processor 410 may operate in the normal-signal quality mode during the entire period of one TTI, causing unnecessary power consumption for voice calls. Keeping the signal quality mode of the RF processor 410 high, even in the transport channel of a low transfer rate, may cause an unnecessary increase in the total power consumption of the terminal.

A controller 440 may determine whether to operate the decoder 430 in the normal decoding mode or the early decoding mode for at least one TTI. Upon determining to operate the decoder 430 in the early decoding mode, the controller 440 may transmit an instruction signal to the RF processor 410 and/or control the BB processor 420 depending on the decoding results provided from the decoder 430 so that the RF processor 410 and/or the BB processor 420 may operate in the operation mode (e.g., a low-signal quality mode or low-power mode) in which the RF processor 410 and/or the BB processor 420 consumes less power. As an example, the low-signal quality mode of the RF processor 410 may allow a signal having an EVM that is not higher than a predetermined threshold. The RF processor 410 may keep the low-signal quality mode during the period corresponding to the remaining slots of the TTI, and return to the normal-signal quality mode in the next TTI.

When starting reception of a transport channel, the RF processor 410 may be set to the normal-signal quality mode, and output a high-signal quality signal. When operating in the early decoding mode, the decoder 430 may attempt to decode the data provided from the BB processor 420 at a time (e.g., a predetermined early decoding time) indicated by the controller 440, or at every slot, and report the decoding results to the controller 440. If multiple transport channels are set in the receiver, the decoder 430 may decode signals of the multiple transport channels individually at every slot, and provide the decoding results for the multiple transport channels to the controller 440. If a decoding success is notified from the decoder 430 at a slot other than the last slot of one TTI, the controller 440 may transmit an instruction signal to the RF processor 410 so that the RF processor 410 operates in the low-signal quality mode (i.e., a low-power mode) during the remaining slot(s) of the TTI. That is, the instruction signal indicates the RF processor 410 to the low-signal quality mode.

In an embodiment of the present disclosure, the controller 440 may determine a time (e.g., an early decoding time) at which the decoder 430 will attempt early decoding. The BB processor 420 may perform channel estimation, frequency/time synchronization and channel compensation on the signal samples of the baseband signals provided from the RF processor 410, estimate channel qualities for the signal samples, and report the estimated channel qualities to the controller 440. The channel qualities may be, for example, SIRs for the signal samples of each slot. The controller 440 may determine whether the decoder 430 will attempt early decoding at a certain slot, by using the SIR for the slot as a link quality metric for the slot. The early decoding time may be determined in units of slots, or in units of a period including a predetermined number of slots.

In one embodiment of the present disclosure, the controller 440 may store the time at which 'Cyclic Redundancy Code (CRC) good' is reported from the decoder 430 as a decoding result in one TTI, as an early decoding time of the next TTI, and may provide information about the early decoding time to the decoder 430 in the next TTI. The decoder 430 may decode the signals that have been received until the early decoding time indicated by the controller 440 in one TTI.

Figure 5:
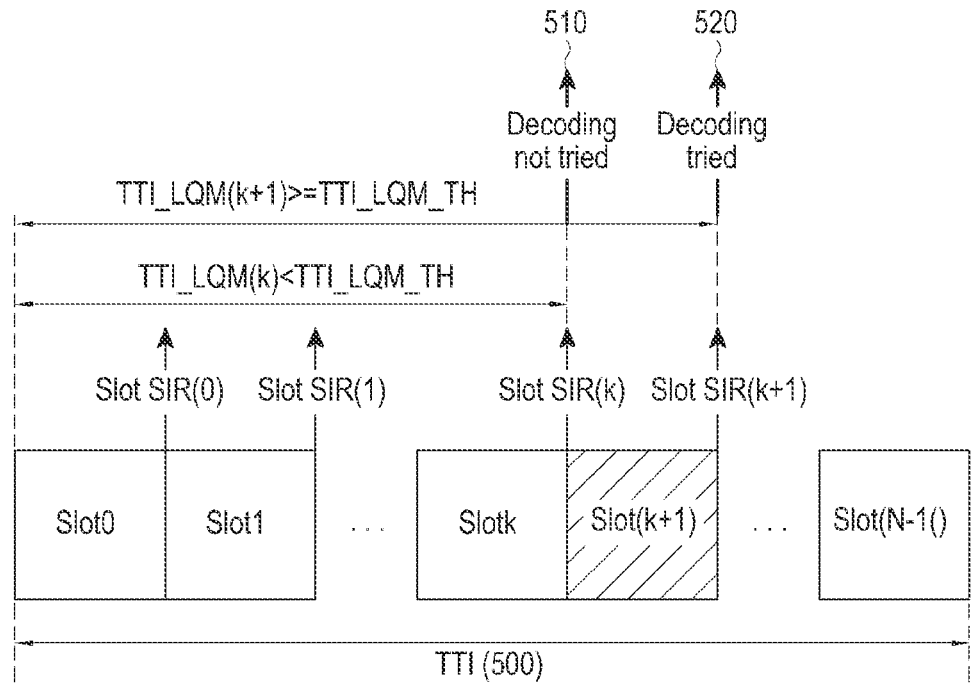
FIG. 5 is a timing diagram illustrating a decoding operation of an early decoding mode, according to an embodiment of the present disclosure.

FIG. 5 is a timing diagram illustrating a decoding operation of an early decoding mode, according to an embodiment of the present disclosure.

Referring to FIG. 5, in a current TTI 500, the BB processor 420 may measure an SIR indicating the channel quality in units of slots, using the pilot channel or reference channel transmitted from a base station, and report the SIR to the controller 440. In FIG. 5, slot SIR(k) may be the channel quality of a slot k, or the channel qualities for signals during a slot 0 to a slot k. The controller 440 may derive a link quality metric (LQM) TTI_LQM(k) based on the slot SIR(k) reported by the BB processor 420. TTI_LQM(k) of a slot k may be compared with a predetermined threshold TTI_LQM_TH, and the controller 440 may determine whether to attempt to decode the signals that have been received until the slot k, depending on the comparison results. The threshold may be obtained from a look-up table in which the slots at which decoding is to be attempted have different values, or may be implemented as the same one constant value for the slots at which decoding is to be attempted. The controller 440 may calculate the link quality metric TTI_LQM based on the slot SIR in accordance with a predetermined algorithm, and as the algorithm, the controller 440 may use, for example, the technique well known in the art.

When TTI_LQM(k) of a slot k is less than TTI_LQM_TH (see reference numeral 510), the controller 440 may control the decoder 430 not to attempt decoding at the slot k. If TTI_LQM(k+1) of a slot (k+1) is greater than or equal to TTI_LQM_TH (see reference numeral 520), the controller 440 may control the decoder 430 to attempt decoding at the slot (k+1). In this case, the early decoding time is the slot (k+1).

The decoder 430 may decode transport channels at the slot indicated by the controller 440 in the TTI of the set multiple transport channels, and report the decoding results to the controller 440. The decoding results may mean the CRC check results for information bits, which have been obtained as a result of the decoding. The CRC check result may be 'CRC good' if decoding is successful, and the CRC check result may be 'CRC bad' if decoding is failed.

If the decoding results for multiple transport channels set in the terminal are different from each other (e.g., if both of 'CRC good' and 'CRC bad' for transport channels occur at a specific slot), the controller 440 may control the decoder 430 to attempt to decode only the transport channels where 'CRC bad' has occurred, at the next slot, or to attempt to decode all the transport channels at the next slot. Accordingly, even though the signal quality mode of the RF processor 410 is kept low during a predetermined period, the reception quality (e.g., BLER) of the transport channels to be received may be secured so as not to cause degradation of performance, compared with the normal decoding mode.

In an alternative embodiment of the present disclosure, the controller 440 may determine a plurality of conditions for performing decoding, at every slot before the expiry of a TTI for each transport channel, or at every predetermined number of slots. The plurality of conditions may include a condition for an effective coding rate of a transport channel. As an example, this condition may be satisfied, if the effective coding rate of the transport channel is less than 1. The plurality of conditions may include a condition for the above-described LQM. The channel quality of each slot may be TTI_LQM that is determined using a pilot channel or reference channel of the slot, and TTI_LQM may be calculated as an effective SIR or mean mutual information per coded bit (MMIB). This condition may be satisfied, if TTI_LQM is greater than or equal to a threshold corresponding to a target BLER of the transport channel. The plurality of conditions may include a condition for the number of remaining slots. As an example, this condition may be satisfied, if a length of the period in which the RF processor 410 may be kept in the low-signal quality mode (e.g., the number of slots from the next slot of the slot where decoding was successful, till the last slot of the current TTI) is greater than the predetermined minimum number (=X, for example 1).

Figure 6A:
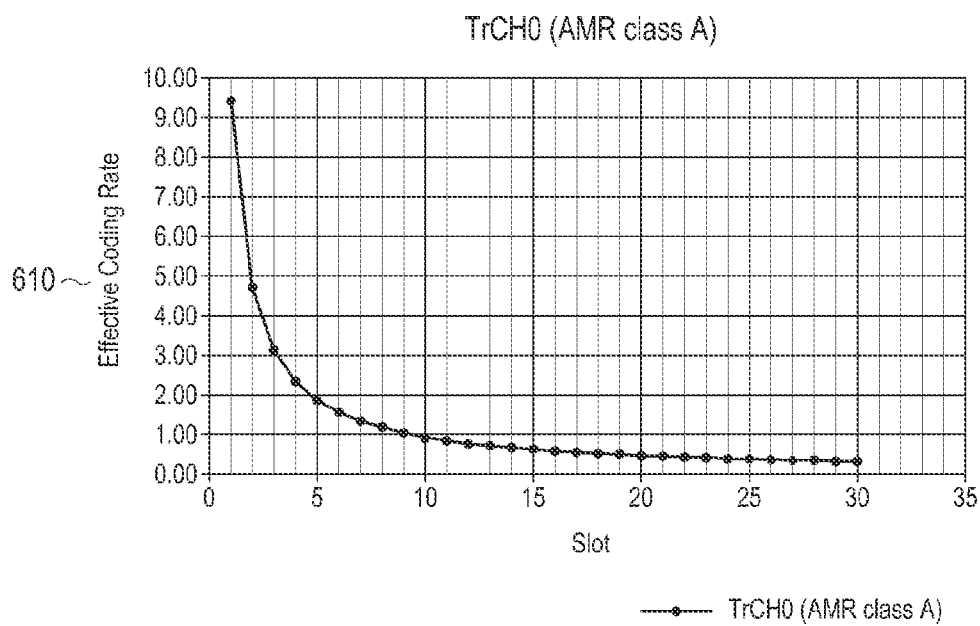
FIGS. 6A and 6B are graphs illustrating effective coding rates that are determined depending on the locations of receive slots for each transport channel, according to an embodiment of the present disclosure.
Figure 6B:
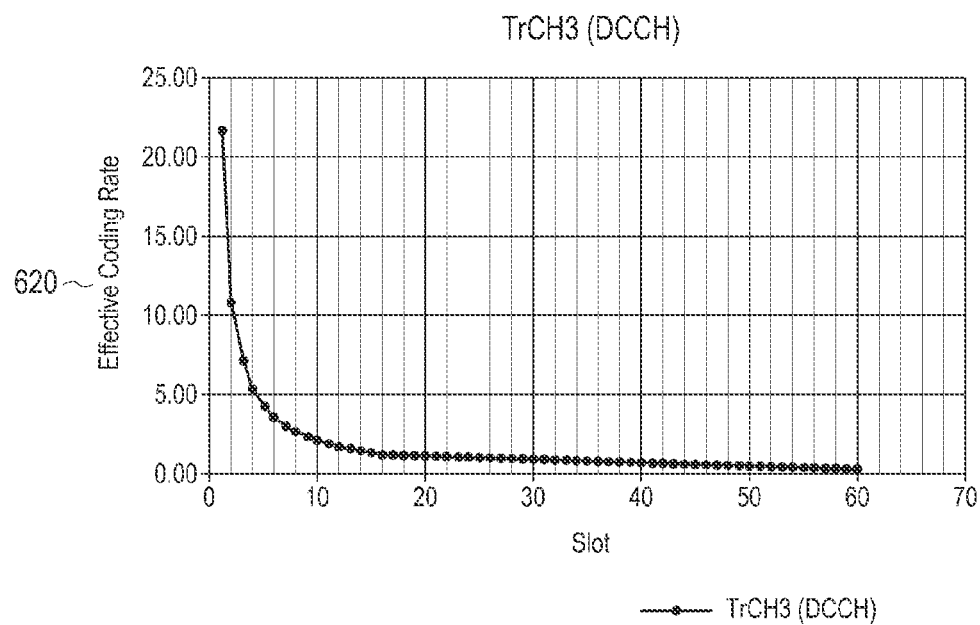

FIGS. 6A and 6B are graphs illustrating effective coding rates that are determined depending on the locations of receive slots for each transport channel, according to an embodiment of the present disclosure. Since an effective coding rate 610 for a transport channel TrCH0 illustrated in FIG. 6A is less than the threshold (=1) beginning at the 10$^{th}$ slot, the controller 440 may determine for TrCH0 that the condition for an effective coding rate will be satisfied at the 10$^{th}$ slot and its succeeding slots. Since an effective coding rate 620 for a transport channel TrCH3 illustrated in FIG. 6B is less than the threshold (=1) beginning at the 22$^{nd}$ slot among the total of 60 slots, the controller 440 may determine for TrCH3 that the condition for an effective coding rate will be satisfied at the 22$^{nd}$ slot and its succeeding slots.

Figure 7:
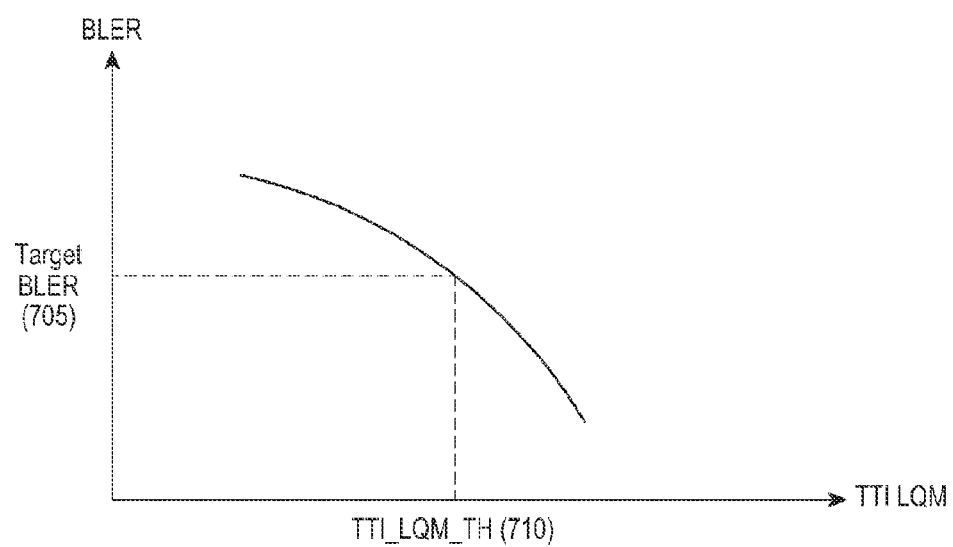
FIG. 7 is a graph illustrating criteria for setting a threshold of a link quality metric for evaluating the channel quality for each slot, according to an embodiment of the present disclosure.

FIG. 7 is a graph illustrating the criteria for setting a threshold of a link quality metric for evaluating the channel quality for each slot, according to an embodiment of the present disclosure. As illustrated, the controller 440 may set a threshold TTI_LQM_TH 710 corresponding to a target BLER 705 required for each of the transport channels that are set in the receiver. BLER that is based on TTI_LQM may be determined using a predetermined table, or may be determined experimentally or empirically.

Figure 8:
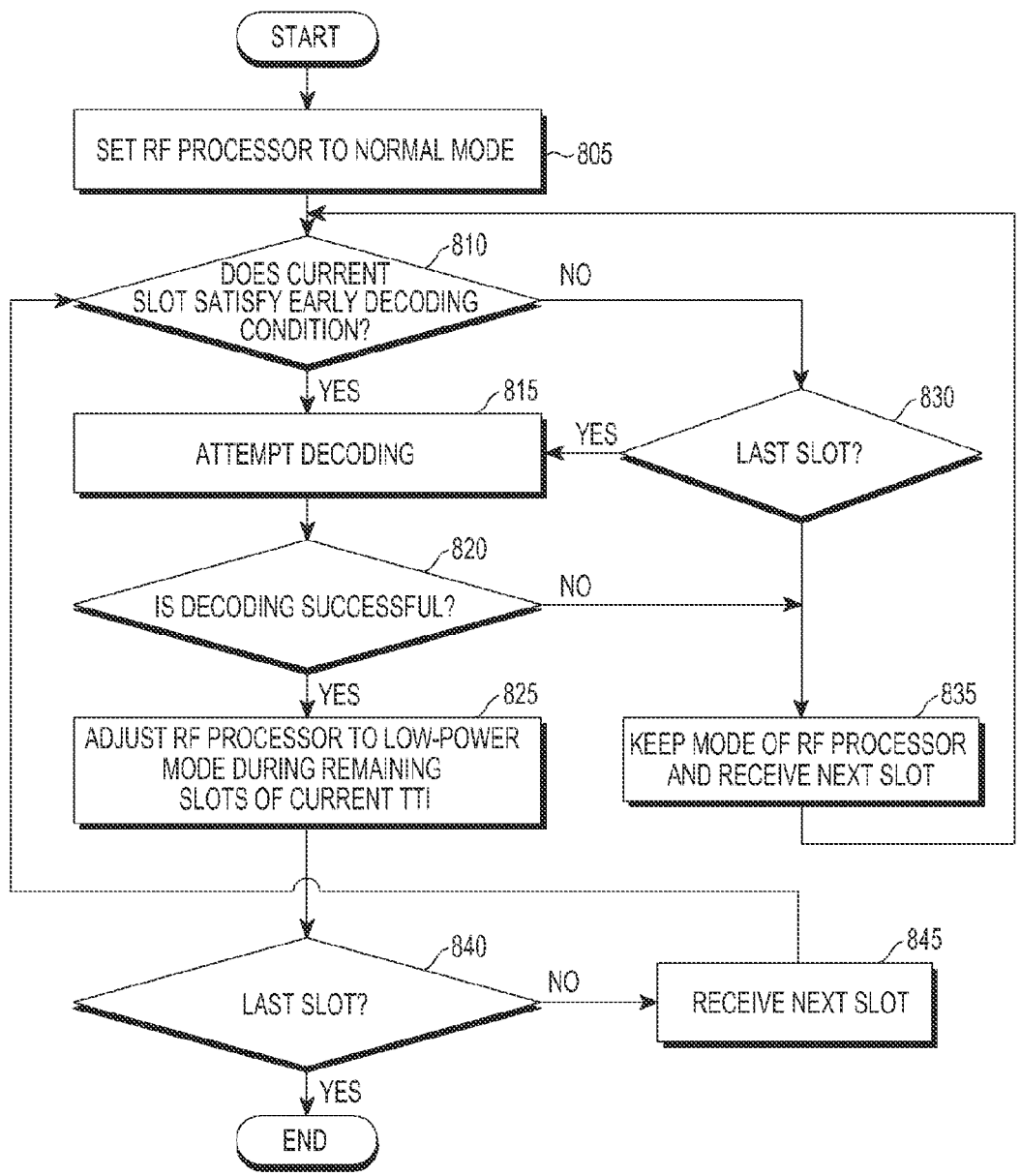
FIG. 8 is a flowchart illustrating an operation of determining early decoding, according to an embodiment of the present disclosure.

FIG. 8 is a flowchart illustrating an operation of determining early decoding, according to an embodiment of the present disclosure. The illustrated operation may be executed in every TTI by, for example, the wireless terminal having the receiver configured as in FIG. 4.

Referring to FIG. 8, in step 805, the controller 440 transmits an instruction signal to the RF processor 410 to set the normal-signal quality mode. The RF processor 410 receives each slot of one TTI on the normal-signal quality mode in response to the instruction signal. The normal-signal quality mode may have a higher EVM, compared with the low-signal quality mode described below, and may require a relatively large power consumption.

In step 810, the controller 440 determines whether all conditions for determining early decoding are satisfied at the current slot, or if necessary, determines whether some conditions are satisfied, at every slot of a TTI. In an embodiment of the present disclosure, the controller 440 determines whether an effective coding rate of a transport channel is less than a predetermined threshold (e.g., 1) at the current slot, whether a link quality metric calculated at the current slot is greater than or equal to a threshold TTI_LQM_TH, and whether the number of remaining slots of the current TTI is greater than a threshold X.

If all of the above conditions are satisfied, the controller 440 instructs the decoder 430 to decode the signals that have been received until the current slot in the current TTI, in step 815. In an alternative embodiment of the present disclosure, the controller 440 determines to perform decoding at the current slot, if at least one (e.g., the condition for an effective coding rate) of above conditions is satisfied.

In step 820, the controller 440 determines whether decoding is successful for the signals that have been received until the current slot, depending on the decoding results received from the decoder 430. If a decoding success is reported, the controller 440 transmits an instruction signal to the RF processor 410 so that the RF processor 410 operates in the low-power mode (e.g., the low-signal quality mode) during the time period corresponding to the remaining slot(s) of the current TTI, in step 825. If multiple transport channels are configured in the receiver, the decoding results may indicate whether decoding of the multiple transport channels is successful. If decoding of all or a predetermined number of transport channels is successful, the controller 440 transmits an instruction signal to the RF processor 410 to set the low-power mode. In an alternative embodiment of the present disclosure, the controller 440 may transmits an instruction signal for stopping or disabling the RF processor 410, instead of an instructing signal indicating the low-power mode during the remaining slots of the current TTI. In another alternative embodiment of the present disclosure, if a decoding success is detected before the expiry of the current TTI, the controller 440 may stop a transmission operation for a call, or stop both of a transmission operation and a reception operation for a call, during the remaining period of the current TTI.

In step 840, the controller 440 determines whether the currently received slot is the last slot of the current TTI. If the currently received slot is the last slot, the controller 440 terminates the operation. If the currently received slot is not the last slot, the controller 440 receives the next slot, in step 845, and then returns to step 810 to determine whether decoding conditions of the next slot are satisfied.

If it is determined in step 810 that the current slot does not satisfy early decoding conditions, the controller 440 determines whether the currently received slot is the last slot of the current TTI, in step 830. If the currently received slot is the last slot, the controller 440 controls the decoder 430 to decode the signals that have been received until the last slot, in step 815, regardless of whether the early decoding conditions are satisfied. However, if the current slot does not satisfy early decoding conditions and is not the last slot, the controller 440 transmits an instruction signal indicating the normal-signal quality mode to the RF processor 410, in step 835, before returning to step 810 to determine early decoding of the next slot.

Figure 9:
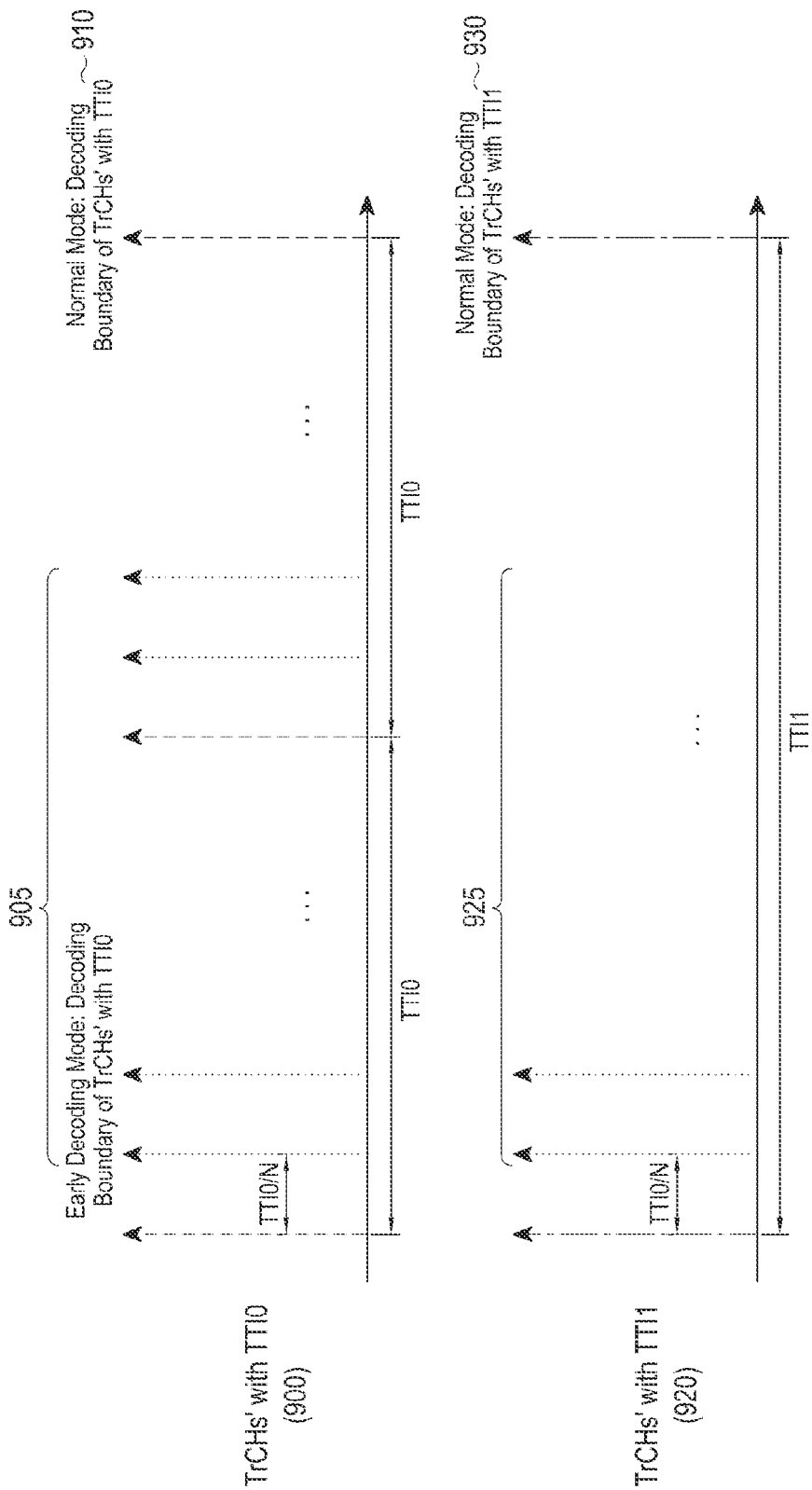
FIG. 9 is a timing diagram illustrating an operation of determining an early decoding time, according to an embodiment of the present disclosure.

FIG. 9 is a timing diagram illustrating an operation of determining an early decoding time, according to an embodiment of the present disclosure. Referring to FIG. 9, reference numeral 900 represents a decoding timing of a transport channel with TTI0, and reference numeral 920 represents a decoding timing of a transport channel with TTI1. Here, TTI0 is ½ of TTI1. A decoder may attempt decoding at every predetermined unit time in one TTI 900 or 920. The unit time is TTI0/N, where N is a positive integer. As an example, the minimum value of TTI0/N may be one slot.

In the case of the transport channel 900 with TTI0, the decoder may perform a maximum of N times of decoding in one TTI, and in the case of the transport channel 920 with TTI1, the decoder may perform a maximum of 2N times of decoding in one TTI. The minimum decoding time for which the decoder can operate may be TTI0/N; the last time of one TTI may be a decoding time 910 or 930 of the normal decoding mode; and the unit times before the expiry of one TTI may be early decoding times 905 and 925.

In the initial TTI, early decoding may begin at the time of TTI0/N.

Figure 10:
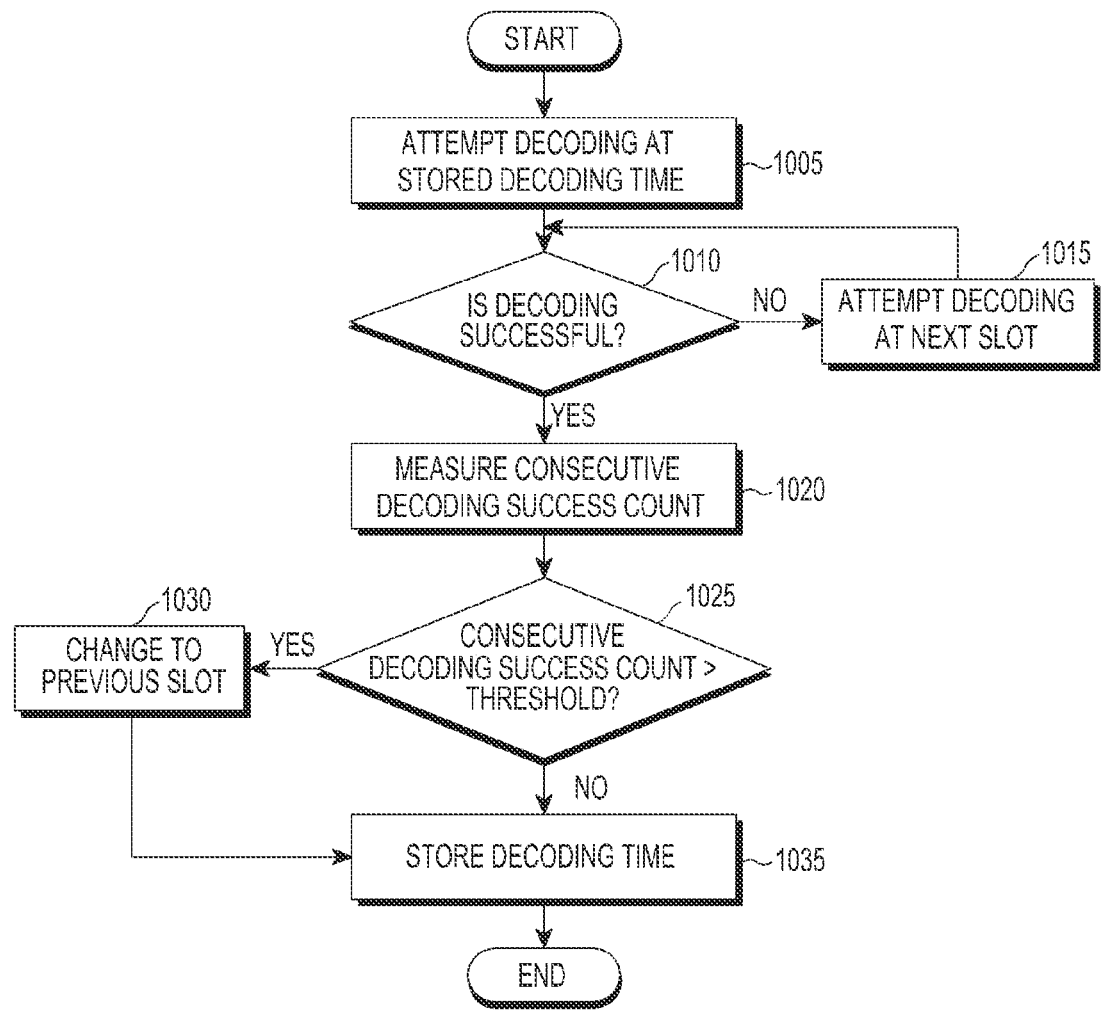
FIG. 10 is a flowchart illustrating an operation of determining an early decoding time, according to an embodiment of the present disclosure.

FIG. 10 is a flowchart illustrating an operation of determining an early decoding time, according to an embodiment of the present disclosure. The illustrated operation may be executed in every TTI by, for example, the wireless terminal having the receiver configured as in FIG. 4.

Referring to FIG. 10, in step 1005, the controller 440 instructs the decoder 430 to attempt decoding at a pre-stored decoding time in the current TTI. In a first TTI, a decoding time may be a unit time (e.g., a first slot) for decoding. In TTIs following the first TTI, the decoding time may be a value that was stored in the previous TTI.

In step 1010, the controller 440 determines whether decoding is successful for the signals that have been received until the specified decoding time, depending on the decoding results received from the decoder 430. If decoding is failed, the decoder 430 receives a signal of the next unit time (e.g., the next slot), and then attempts decoding, in step 1015. If decoding is successful, the controller 440 proceeds to step 1020. When multiple transport channels are configured in the receiver, the controller 440 proceeds to step 1020, if decoding of all or a predetermined number of transport channels is successful.

In step 1020, the controller 440 measures the number of consecutive successes in decoding (hereinafter, referred to as a 'consecutive decoding success count' for short) in previous TTIs including the current TTI. In step 1025, the controller 440 determines whether the consecutive decoding success count exceeds a predetermined threshold D. The consecutive decoding success count may be measured in units of TTIs. As an example, if decoding has been continuously successful during three TTIs preceding the current TTI, the consecutive decoding success count may be 4. The threshold may be changed depending on the channel environment (e.g., the Doppler frequency, etc.). If the threshold is set to '1', the decoding time may be updated in every TTI.

If the consecutive decoding success count exceeds the threshold D, the controller 440 changes the stored decoding time to a time which is a unit time of TTI0/N ahead of the stored decoding time (e.g., a time which is one slot ahead of the stored decoding time), in step 1030. As an example, if the stored decoding time is a slot k, the controller 440 may change the decoding time to a slot (k−1), in step 1030. If the consecutive decoding success count does not exceed the threshold D, the controller 440 may store, as a decoding time, information about the time the decoder 430 succeeded in decoding in the current TTI, in step 1035. The stored decoding time may be used in the next TTI.

If multiple transport channels are configured in the receiver, the operation illustrated in FIG. 10 may be performed individually for each transport channel. If a coding rate of a specific transport channel is changed, the controller 440 may initialize the decoding time of the transport channel.

The embodiment of the present disclosure illustrated in FIG. 10 may be combined with the embodiment of the present disclosure illustrated in FIG. 8. As an example, the controller 440 may check early decoding conditions at every slot (or at every predetermined unit time) beginning at the determined decoding time as in FIG. 10, instead of determining whether early decoding conditions are satisfied, at every slot beginning at a first slot of one TTI.

In an embodiment of the present disclosure described below, a decoding time in which the decoder will perform early decoding in one TTI may be determined depending on the power consumption gain that can be obtained through early decoding. In an embodiment of the present disclosure, the decoding time may be determined depending on at least one of the indicators measured by the terminal (e.g., a signal to interference ratio (SIR) or signal to noise ratio (SNR) of a transport channel, a symbol SNR of a pilot channel, and a BLER of a transport channel).

Figure 11:
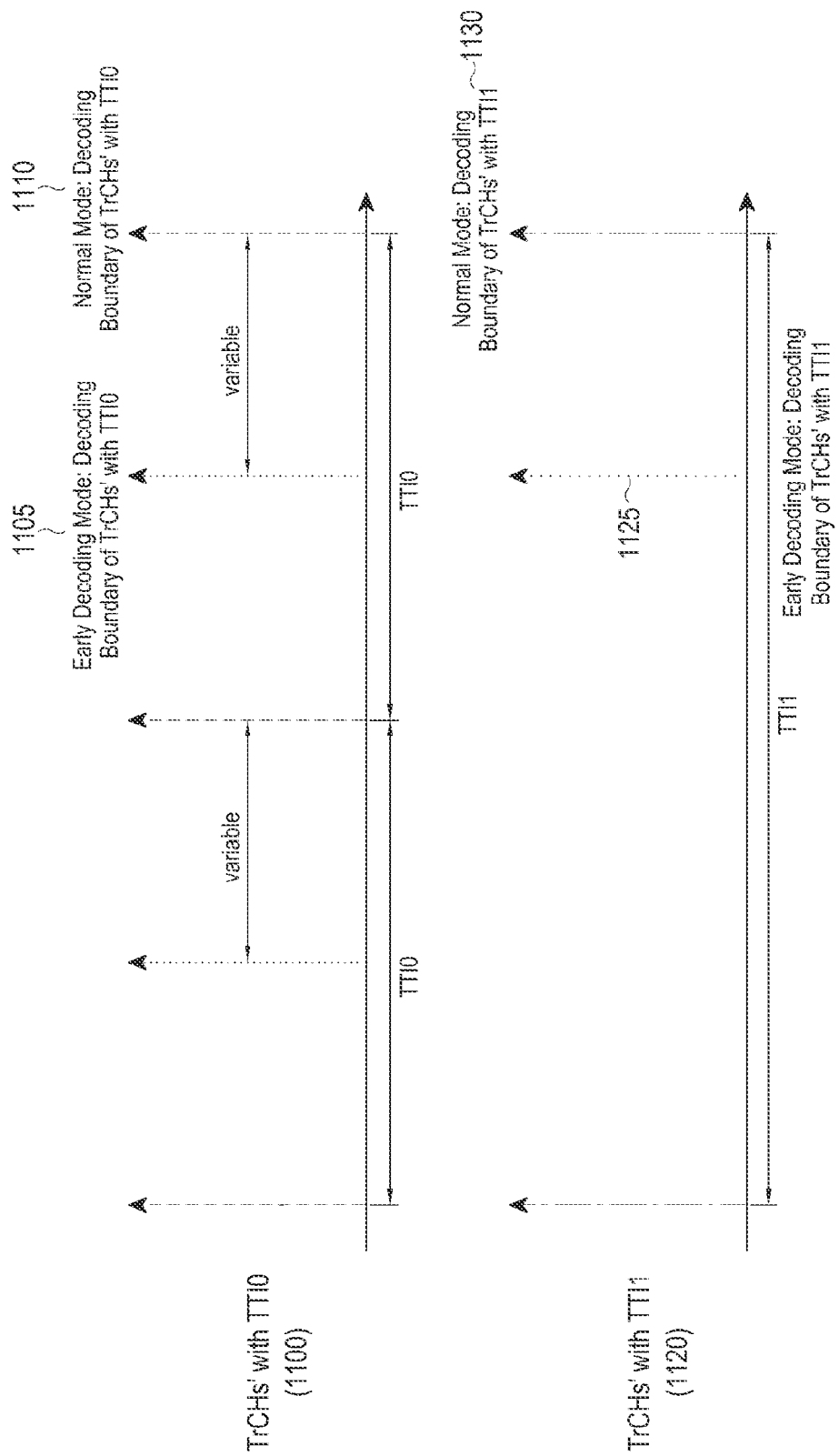
FIG. 11 is a timing diagram illustrating an early decoding time determined, according to an embodiment of the present disclosure.

FIG. 11 is a timing diagram illustrating an early decoding time determined according to an embodiment of the present disclosure.

Referring to FIG. 11, reference numeral 1100 represents a decoding timing of a transport channel with TTI0=20 ms, and the decoder may attempt decoding at an end time 1110 of one TTI in the normal decoding mode, and attempt decoding at a predetermined early decoding time 1105 before the expiry of one TTI in the early decoding mode. Reference numeral 1120 represents a decoding timing of a transport channel with TTI1=40 ms, and the decoder may attempt decoding at an end time 1130 of one TTI in the normal decoding mode, and attempt decoding at a predetermined early decoding time 1125 before the expiry of one TTI in the early decoding mode.

For example, the predetermined early decoding time 1105 may be the time at which the output of the BB processor for the first 10 ms (e.g., one frame) has been fully delivered to the decoder. The early decoding time may be varied by the controller. Assuming that the delay time for passing through the BB processor is negligible if decoding for a signal of the one frame is successful, the controller may output an instruction signal to the RF processor in order to switch the operation mode of the RF processor to the low-signal quality mode during the next frame of about 10 ms. The operation mode of the RF processor may be adjusted to the normal mode at the start time of the next TTI.

If early decoding of the early decoding mode is performed on multiple transport channels having the same TTI, the controller may output an instruction signal to the RF processor in order to adjust the RF process to the normal-signal quality mode upon decoding failure (e.g., CRC bad) in a predetermined number of transport channels. In this case, the decoder may perform decoding on the transport channels, decoding of which was failed in the previous decoding time, or on all the transport channels whose TTI expires, at the decoding time of the normal decoding mode (i.e., at the end time of one TTI).

Figure 12:
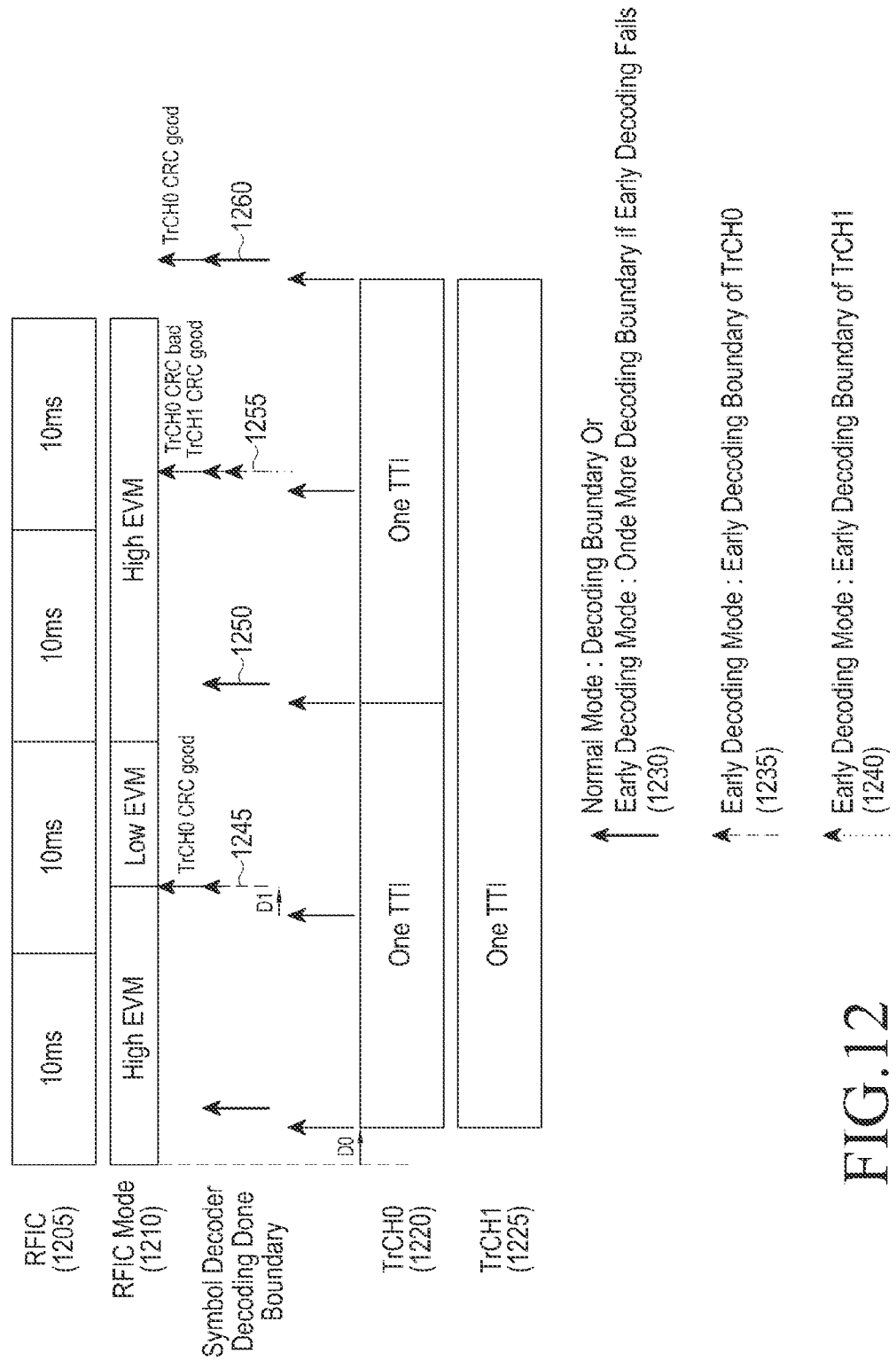
FIG. 12 is a timing diagram illustrating a decoding operation for multiple transport channels, according to an embodiment of the present disclosure.

FIG. 12 is a timing diagram illustrating a decoding operation for multiple transport channels, according to an embodiment of the present disclosure.

Referring to FIG. 12, at least one transport channel TrCH0 1220 with TTI=10 ms and at least one transport channel TrCH1 1225 with TTI=20 ms are set up in the receiver, and an RF processor (that is, RFIC) 1205 operates in units of the minimum TTI of 10 ms.

Reference numeral 1230 represents the decoding time that is determined in accordance with the normal decoding mode, or the decoding time at the failure of early decoding in the early decoding mode. Reference numeral 1235 represents the decoding time of TrCH0 1220 in the early decoding mode, and reference numeral 1240 represents the decoding time of TrCH1 1225 in the early decoding mode.

At the start time of a TTI, an operation mode 1210 of the RF processor is set to the normal-signal quality mode (e.g., high EVM) by an instruction signal sent from the controller. At a decoding time 1245, if decoding for symbols of TrCH0 is successful, the operation mode 1210 of the RF processor may be adjusted to the low-signal quality mode (e.g., low EVM) by an instruction signal sent from the controller. The low-signal quality mode may be kept until the TTI expires, and the RF processor may be initialized to the normal-signal quality mode at the beginning of the next TTI by an instruction signal sent from the controller. Since decoding of TrCH0 was successful at the decoding time 1245, the decoder does need to decode TrCH0 at a decoding time 1250.

At the decoding time 1250, the decoder may decode symbols of TrCH0 and TrCH1 separately. If the decoder has failed in decoding TrCH0 and has succeed in decoding TrCH1, the operation mode 1210 of the RF processor may be kept at the high-signal quality mode by an instruction signal sent from the controller. Since the decoder has failed in decoding TrCH0, the decoder may re-attempt to decode all signals of TrCH0 received in the TTI at a decoding time 1260.

Figure 13:
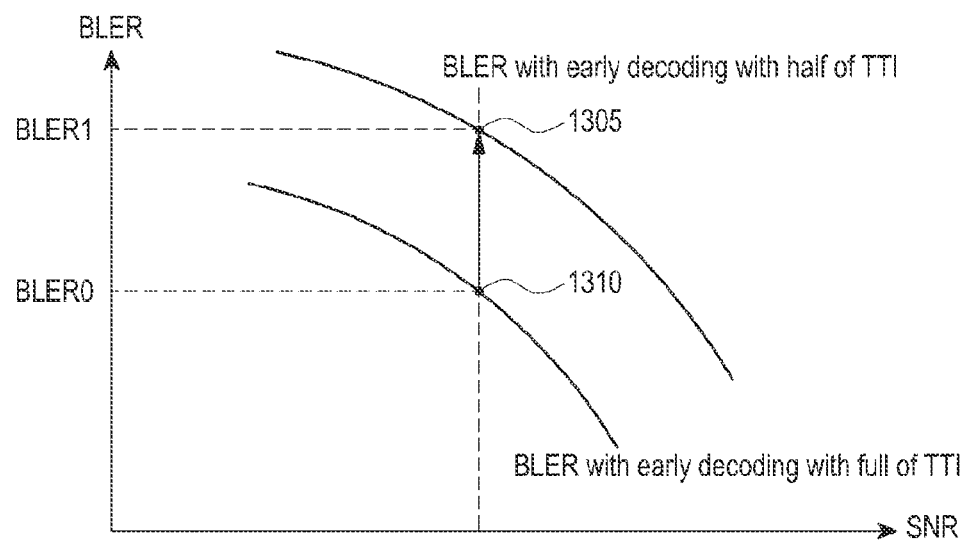
FIG. 13 is a graph illustrating a comparison between a normal decoding mode and an early decoding mode in terms of the reception quality that is determined depending on the channel environment, according to an embodiment of the present disclosure.

FIG. 13 is a graph illustrating a comparison between a normal decoding mode and an early decoding mode in terms of the reception quality that is determined depending on the channel environment, according to an embodiment of the present disclosure. Herein, the channel environment is represented by symbol SNR and the reception quality is represented by BLER.

Referring to FIG. 13, at the same symbol SNR, BLER0 1310, for a case (i.e., the normal decoding mode) where the decoder attempts decoding at the end time of one TTI, is less than BLER1 1305 for a case (i.e., the early decoding mode) where the decoder attempts decoding at the middle time. Therefore, the reception quality of the normal decoding mode may degrade, compared with the early decoding mode. Therefore, the controller may determine whether to enable the early decoding mode of the decoder depending on various criteria.

As an example, if the reception quality of transport channels within a certain window (or time period) satisfies certain criteria, the early decoding mode of the decoder may be enabled. As another example, the controller may determine whether to continue the early decoding mode, based on the block error rate of the early decoding mode, which the controller has obtained by unconditionally enabling the early decoding mode during a certain window, and on the pre-calculated power consumption gain. The power consumption gain may be calculated based on, for example, a power consumption gain value caused by adjustment of the operation mode of the RF processor and a power consumption increase value caused by the increase in the number of decoding of the decoder. As a further example, if occurrence of a burst error is detected, the early decoding mode may not be performed until the burst error is released or resolved.

Figure 14:
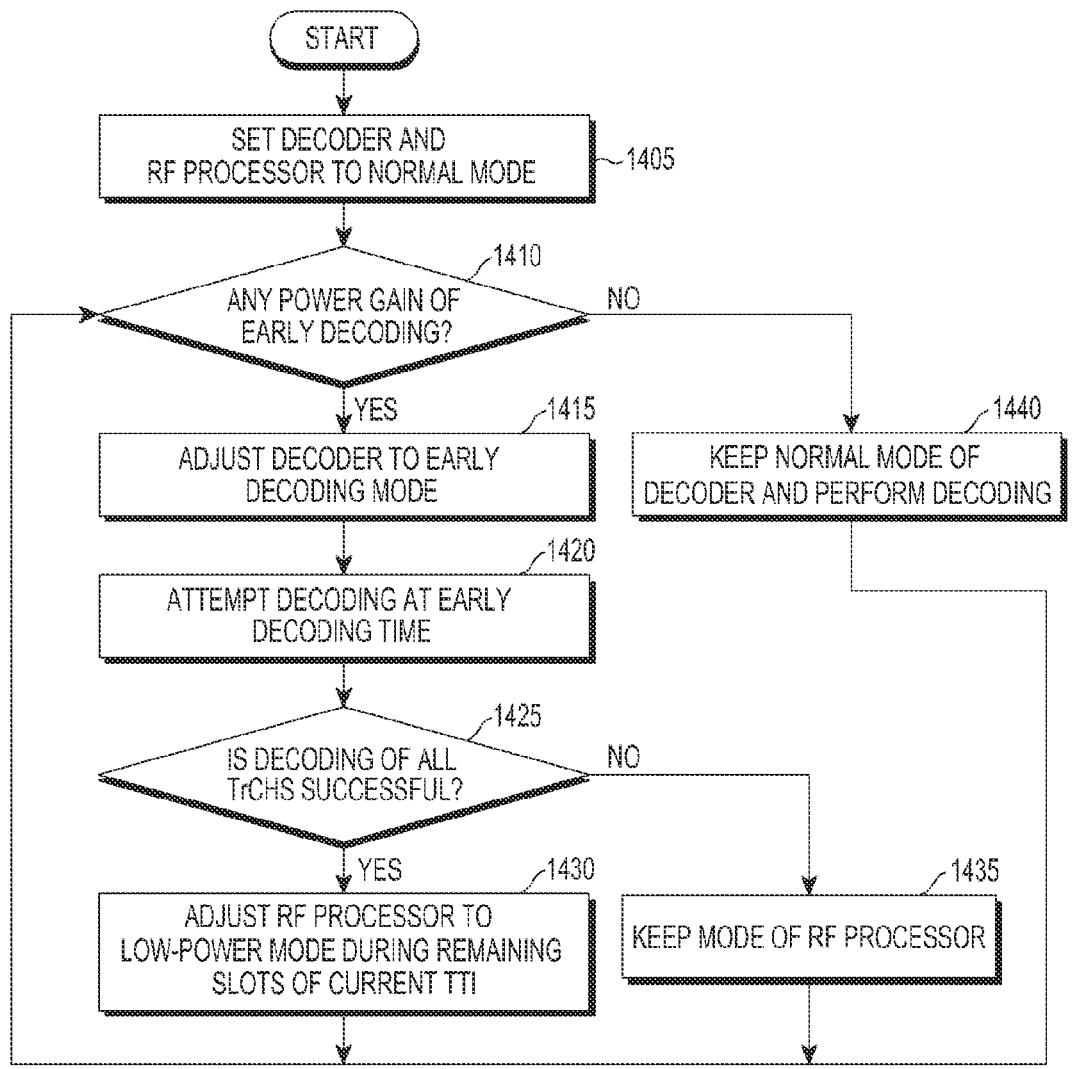
FIG. 14 is a flowchart illustrating an operation of enabling an early decoding mode, according to an embodiment of the present disclosure.

FIG. 14 is a flowchart illustrating an operation of enabling an early decoding mode, according to an embodiment of the present disclosure. The illustrated operation may be executed in every TTI of each transport channel, or may be executed in every predetermined operating cycle including at least one TTI, or may be aperiodically executed depending on a predetermined trigger condition by, for example, the wireless terminal having the receiver configured as in FIG. 4.

Referring to FIG. 14, in step 1405, the controller 440 transmits an instruction signal to the RF processor 410 to set the RF processor 410 to the normal-signal quality mode, and sets the decoder 430 to the normal decoding mode. In step 1410, the controller 440 determines whether to enable the early decoding mode depending on the characteristics of each transport channel and the power consumption gain that can be obtained through early decoding. If the early decoding mode cannot be enabled or the gain that can be obtained through early decoding is very low or negligible, the controller 440 keeps the decoder 430 at the normal decoding mode, in step 1440.

In an embodiment of the present disclosure, the controller 440 may determine to enable the early decoding mode, if the reception quality of transport channels within a previous certain window satisfies certain criteria. In an alternative embodiment of the present disclosure, the controller 440 may estimate the reception quality (e.g., BLER) of transport channels during early decoding, based on the channel quality indicators (e.g., an SNR of a data channel or a pilot channel, an SIR of a pilot channel, a Doppler estimate, a channel delay profile (CDP) detection value, etc.) provided from the BB processor 420, and determine whether to enable the early decoding mode depending on the BLER. As an example, if a block error rate of the early decoding mode, which the controller has obtained during a certain window, does not exceed a predetermined threshold, the controller 440 may determine to enable the early decoding mode. As another example, the controller 440 may calculate a power consumption gain based on a sum of a power consumption gain value obtained by the low-signal quality mode of the RF processor 410 and a power consumption increase value obtained by the early decoding mode of the decoder 430, and determine to enable the early decoding mode, if the power consumption gain exceeds a predetermined threshold.

The block error rate of the early decoding mode may be calculated from the symbol SNR that the controller 440 has actually estimated for the transport channel or the pilot channel, based on the information (e.g., graph or table) indicating a relationship between the symbol SNR measured for the transport channel and the BLER of the early decoding mode. A technique for mapping between an effective SNR and a BLER is well known in the art.

In alternative embodiment of the present disclosure, if occurrence of a burst error is detected from a wireless channel, the controller 440 may enable the early decoding mode, and determine to keep the early decoding mode until the burst error is released. In alternative embodiment of the present disclosure, the controller 440 may enable the early decoding mode depending on the information indicated by an upper layer.

If the controller 440 determines to enable the early decoding mode, the controller 440 operates the decoder 430 in the early decoding mode, in step 1415. In step 1420, the decoder 430 performs decoding at a predetermined early decoding time in each TTI of transport channels configured in the receiver, or at an early decoding time indicated by the controller 440, and provides the decoding results for each transport channel to the controller 440.

In step 1425, the controller 440 determines whether the reception quality of transport channels, for which the decoder 430 has attempted decoding, satisfies predetermined conditions. As an example, if a decoding success is notified for all or a predetermined number T of transport channels, the controller 440 proceeds to step 1430, determining that the reception quality is good. In step 1430, the controller 440 transmits an instruction signal to the RF processor 410 to adjust the RF processor 410 to the low-signal quality mode during the period corresponding to the remaining slots of the current TTI. In the next TTI of the transport channels, the RF processor 410 may be returned back to the normal-signal quality mode.

If the decoder 430 has failed in decoding in at least one transport channel, or if the number of successfully decoded transport channels is less than a predetermined number T, the controller 440 transmits an instruction signal to the RF processor 410 to keep the RF processor 410 at the high-signal quality mode, in step 1435. In one embodiment of the present disclosure, the controller 440 may transmit an instruction signal to the RF processor 410 to adjust the RF processor 410 to the high-signal quality mode, in step 1435. The high-signal quality mode may include, for example, a higher EVM than the low-signal quality mode.

In the normal decoding mode, the decoder may attempt decoding at the end time of a TTI of each transport channel, and in the early decoding mode, the decoder may attempt decoding at a time before the expiry of a TTI of each transport channel. In other words, the decoder may attempt decoding for all or some of the transport channels at every slot.

The embodiment of the present disclosure illustrated in FIG. 14 may be combined with at least one of the embodiments in FIGS. 8 and 10. As an example, the controller 440 may determine whether to enable the early decoding mode at stated periods. If the controller 440 determines to enable the early decoding mode, the controller 440 may perform early decoding as in the embodiment of FIG. 8 or 10.

Various embodiments of the present disclosure may be implemented as a computer-readable code in a computer-readable recording medium in a particular point of view. The computer-readable recording medium may be any data storage device capable of storing the data that can be read by the computer system. Examples of the computer-readable recording medium may include read only memories (ROMs), random access memories (RAMs), compact disk-read only memories (CD-ROMs), magnetic tapes, floppy disks, optical data storage devices, and carrier waves (e.g., data transmission over the Internet, etc.). The computer-readable recording medium may be distributed over the computer systems connected to the network, so the computer-readable code may be store and executed in a distributed manner. Functional programs, codes and code segments for achieving various embodiments of the present disclosure may be easily interpreted by the programmers skilled in the art.

It can be appreciated that the apparatus and method, according to various embodiments of the present disclosure may be implemented by hardware, software or a combination thereof. The software may be stored in a volatile or non-volatile storage device (e.g., an erasable/re-writable ROM, or the like), a memory (e.g., a RAM, a memory chip, a memory device, a memory IC, or the like), or an optically/magnetically recordable machine (or computer)-readable storage medium (e.g., a compact disk (CD), a digital versatile disk (DVD), a magnetic disk, magnetic tape, or the like). The method, according to various embodiments of the present disclosure may be implemented by a computer or a mobile terminal that includes a controller, a memory, a transceiver, and/or at least one antenna. It can be noted that the memory is an example of a machine-readable storage medium suitable to store a program or programs including instructions for implementing embodiments of the present disclosure.

Therefore, the present disclosure may include a program including a code for implementing the apparatus and/or method as defined by the appended claims, and a machine (or computer)-readable storage medium storing the program. The program may be electronically carried by any media such as communication signals that are transmitted through wired or wireless connections.

The apparatus, according to various embodiments of the present disclosure may receive and store a program from a program server to which the apparatus is connected by wires or wirelessly. The program server may include a memory for storing a program including instructions for allowing a program handling unit to perform a set content protection method, and also storing information necessary for the content protection method, a communication unit for performing wired/wireless communication with a graphic processing unit, and a control for transmitting the program through a transceiver automatically or at the request of the graphic processing unit.

While the disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:

1. An apparatus for reducing power consumption by early decoding, the apparatus comprising:
a baseband processor configured to process a received signal from a radio frequency (RF) processor;
a decoder configured to decode an output signal of the baseband processor; and
a controller configured to:
determine whether a predetermined decoding condition is satisfied upon expiration of a time unit in a transmission time interval;
control the decoder to perform decoding on a signal that has been received through the time unit in the transmission time interval, when the predetermined decoding condition is satisfied;
transmit an instruction signal to the RF processor to set a low-power mode during a remaining time period of the transmission time interval after the time unit in the transmission time interval, when the decoding is successful; and
control the decoder to perform decoding on the radio signal upon expiration of a last time unit of the transmission time interval regardless of the predetermined decoding condition, when the time unit is the last time unit in the transmission time interval.

2. The apparatus of claim 1, wherein the decoding condition comprises at least one of:
a first condition that is satisfied if an effective coding rate of the signal, which has been received upon expiration of the time unit, is less than a first threshold;
a second condition that is satisfied if a link quality metric calculated at the time unit is greater than or equal to a second threshold; and
a third condition that is satisfied if the number of time units following the time unit in the transmission time interval is greater than a third threshold.

3. The apparatus of claim 1, wherein determining whether the predetermined decoding condition is satisfied comprises initiating a determination of the predetermined decoding condition at a time, which is determined based on decoding results of a previous transmission time interval, in the transmission time interval.

4. The apparatus of claim 1, wherein the low-power mode includes at least one of a low error vector magnitude (EVM) for the RF processor, stoppage of a transmission operation for a call, and stoppage of a transmission and reception operation for a call.

5. The apparatus of claim 1, wherein the controller is further configured to determine whether to perform early decoding in the transmission time interval depending on at least one of a power consumption gain that can be obtained through early decoding, and a reception quality during a predetermined time period preceding the transmission time interval, at a start time of the transmission time interval.

6. The apparatus of claim 1, wherein the controller is further configured to transmit an instruction signal to the RF processor to maintain a current mode and receive a next time unit of the transmission time interval, when the decoding is not successful, or when the predetermined decoding condition is not satisfied and the time unit is not the last time unit.

7. An apparatus for reducing power consumption by early decoding, the apparatus comprising:
a baseband processor configured to process a received signal from a radio frequency (RF) processor;
a decoder configured to decode an output signal of the baseband processor; and
a controller configured to:
perform decoding on a signal that has been received through a predetermined early decoding time in a transmission time interval;

control the decoder to perform decoding on the radio signal that has been received at a next time unit in the transmission time interval, when the decoding fails;

determine whether a consecutive decoding success count including a decoding success over the transmission time interval exceeds a predetermined threshold, when the decoding succeeds; and reduce the predetermined early decoding time by the single time unit, if the consecutive decoding success count exceeds the predetermined threshold.

8. The apparatus of claim 7, wherein the consecutive decoding success count is measured in units of transmission time intervals.

9. The apparatus of claim 7, wherein the controller is further configured to determine whether a predetermined decoding condition is satisfied at every time unit beginning at the predetermined early decoding time in the transmission time interval, and to perform decoding on a signal that has been received through a time unit in the transmission time interval, when the decoding condition is satisfied in the time unit.

10. The apparatus of claim 7, wherein the controller is further configured to transmit an instruction signal to the RF processor to set a low-power mode during a remaining time period of the transmission time interval, when the decoding is successful.

11. The apparatus of claim 7, wherein the controller is further configured to determine whether to perform early decoding in the transmission time interval, depending on at least one of a power consumption gain that can be obtained through early decoding, and a reception quality during a predetermined time period preceding the transmission time interval, at a start time of the transmission time interval.

12. The apparatus of claim 7, wherein the controller is further configured to store a decoding time, when the consecutive decoding success count does not exceed the predetermined threshold, or when the predetermined early decoding time is reduced.

13. An apparatus for reducing power consumption by early decoding, the apparatus comprising:

a radio frequency (RF) processor configured to receive a radio signal;

a baseband processor configured to process an output signal of the RF processor;

a decoder configured to decode the output signal of the baseband processor; and a controller configured to:
  determine whether to perform early decoding in a transmission time interval, depending on at least one of a power consumption gain that can be obtained through early decoding, and a reception quality during a predetermined time period preceding the transmission time interval, at a start time of the transmission time interval;

control the decoder to perform decoding on the radio signal through a predetermined early decoding time in the transmission time interval, when it is determined to perform the early decoding; and set the RF processor to a low-power mode during a remaining time period of the transmission time interval, when the decoding succeeds; and control the decoder to perform decoding on the radio signal upon expiration of a last time unit of the transmission time interval regardless of a predetermined decoding condition, when a time unit is the last time unit in the transmission time interval.

14. The apparatus of claim 13, wherein the controller is further configured to determine to perform early decoding during the predetermined time period in the transmission time interval, when a reception quality of transport channels satisfies a predetermined criteria.

15. The apparatus of claim 13, wherein the controller is further configured to determine to perform early decoding in the transmission time interval, when a block error rate of a signal that is received in an early decoding mode during the predetermined time period does not exceed a first threshold.

16. The apparatus of claim 13, wherein the controller is further configured to calculate the power consumption gain through a sum of a power consumption gain value that is based on operating the RF processor in the low-power mode and a power consumption increase value that is based on operating a decoder in an early decoding mode, and to determine to perform early decoding in the transmission time interval, if the power consumption gain exceeds a second threshold.

17. The apparatus of claim 13, wherein the controller is further configured to determine whether a predetermined decoding condition is satisfied at every time unit beginning at the early decoding time in the transmission time interval, and if the decoding condition is satisfied in a time unit, to perform decoding on a signal that has been received through the time unit in the transmission time interval.

18. The apparatus of claim 13, wherein the predetermined early decoding time is determined depending on decoding results of a previous transmission time interval.

19. The apparatus of claim 13, wherein the controller is further configured to maintain a current mode of the RF processor, when there is no power consumption gain that can be obtained through early decoding, or when the decoding on the radio signal through the predetermined early decoding time is unsuccessful.

* * * * *